United States Patent
Eberhart et al.

[11] Patent Number: 6,138,789
[45] Date of Patent: Oct. 31, 2000

[54] HYDRAULIC RACK AND PINION STEERING

[75] Inventors: Eugen Eberhart, Düsseldorf; Alexander Wiertz, Solingen; Uwe Herleth, Aschaffenburg, all of Germany

[73] Assignee: TRW Fahrwerksysteme GmbH & Co. KG, Dusseldorf, Germany

[21] Appl. No.: 09/098,140

[22] Filed: Jun. 16, 1998

[30] Foreign Application Priority Data

Jun. 19, 1997 [DE] Germany .......................... 197 25 944

[51] Int. Cl.⁷ .................................................. B62D 5/06
[52] U.S. Cl. ........................ 180/428; 180/417; 180/441; 91/47; 91/400
[58] Field of Search ................................. 180/403, 417, 180/425, 439, 441, 427, 442, 428; 91/47, 48, 400, 402

[56] References Cited

U.S. PATENT DOCUMENTS

| | | | |
|---|---|---|---|
| 1,692,034 | 11/1928 | Griffin | 91/402 |
| 2,882,685 | 4/1959 | Carlsen et al. | 91/402 |
| 3,472,125 | 10/1969 | Noble | 91/47 |
| 4,189,983 | 2/1980 | Fassbender et al. | 91/400 |
| 4,828,068 | 5/1989 | Wendler et al. | 91/400 |
| 5,217,245 | 6/1993 | Guy | 91/402 |

FOREIGN PATENT DOCUMENTS

| | | | |
|---|---|---|---|
| 2303976 | 10/1976 | France | 91/402 |
| 19514244 | 10/1976 | Germany . | |
| 4221459 | 1/1994 | Germany . | |
| 112646 | 1/1918 | United Kingdom | 91/402 |

*Primary Examiner*—Daniel G. DePumpo
*Attorney, Agent, or Firm*—Tarolli, Sundheim, Covell, Tummino & Szabo L.L.P.

[57] ABSTRACT

To improve a rack and pinion steering of the generic type to reduce noise development upon opening of the pressure-relief bore as well as in steady-state operation, the invention proposes that at least one filter element forming a flow resistance be inserted between the additional bore and the pressure connection.

8 Claims, 5 Drawing Sheets

HYDRAULIC RACK AND PINION STEERING

The invention relates to a hydraulic rack and pinion steering, in which a piston is guided in a hydraulic cylinder bounded by an end stop so that, in an end position of the piston, a path is created for the pressure fluid supplied to the piston via pressure fluid bores from the pressurized working area to a pressure area of reduced pressure. This end stop consists of an additional bore leading into the hydraulic cylinder disposed in the region of a pressure connection bore. A connection line connects this additional bore with the respective pressure connection.

Such generic hydraulic rack and pinion steering units are known, for example, from DE 195 14 244 A1 or DE 42 21 459 A1, wherein blind holes or connection bores are made in the interior of the housing to provide two parallel pressure fluid lines from each individual pressure fluid connection. The piston passing the first of the two parallel pressure fluid bores effectively causes a hydraulic pressure relief, which causes the piston to stop moving. The piston is then located between the two parallel bores. When the pressure is switched, non-return valves close the previously passed bore so that pressure fluid can be effectively supplied through the other bore.

In practice, it has been shown that the piston passing the first of the two parallel bores causes a very loud flow-associated intermediate noise, which has proven to be unacceptable in operation. The noise occurs particularly at the beginning of the partial opening of the bore by the piston ring. Since it is quite feasible that the piston will remain in that position for a prolonged period of time, this may also cause erosion-associated damage to the piston ring.

Based on this state of the art, it is the object of the present invention to improve a rack and pinion steering unit of the generic type so as to reduce the noise developing when the pressure-relief bore is opened as well as in a steady-state operation. The invention furthermore proposes means to prevent erosion-associated damage to the seal.

To attain the noise-related object, the invention proposes to use at least one filter element to create flow resistance between the additional bore and the pressure connection.

Inserting the filter element between the bore used for pressure reduction and the return pressure connection causes the desired pressure build-up to be distributed over the bore and the filter element so that noise is largely prevented.

According to an advantageous proposal of the invention, the filter element is inserted in the region of the pressure connection. This may be accomplished in a particularly advantageous manner by inserting a filter bushing. Consequently, installation or even retrofitting, where indicated, are substantially simplified.

Advantageously, the filter element is a bushing element or, according to a further proposal by the invention, an apertured diaphragm or, according to a supplemental proposal, a wire mesh. Other similarly effective materials are feasible, for example, sintered metals or the like.

According to an additional advantageous proposal by the invention, the flow resistance is a function of the flow direction. With this measure, the pressure-relief bore, for example, may be provided with increased resistance during pressure switching in order to facilitate pressure build-up. In the best case, this may eliminate the use of a non-return valve.

The invention provides a means for reducing or optimizing noise, which is very simple from a manufacturing and installation point of view but extremely effective.

To prevent erosion-associated seal damage, the invention particularly advantageously proposes to equip the rack and pinion steering unit with a control valve for the additional bore that is intended for pressure relief. The use of an arbitrarily controllable additional control valve makes it possible to open the pressure-relief bore independently of the piston position, for example, only after the piston has completely passed the bore. This prevents the piston ring from unlocking only a small area of the bores, which is another means for reducing noise development. It also prevents erosion-associated damage to the seal.

According to a particularly advantageous proposal of the invention, the control valve is controlled as a function of the hydraulic pressure prevailing at predetermined locations of the rack and pinion steering. For example, a position located between the two bores may be defined. Only when the full hydraulic pressure is reached at that position, the additional bore for pressure relief is opened. Particularly advantageously, the control valve may be formed by a pilot valve, which interacts with a control bore located between the two bores. The pilot valve is advantageously spring-loaded.

The use of a control valve as proposed by the invention basically permits an arbitrary opening and closing of the additional bore for specific pressure relief. For example, the additional bore may be opened after the piston has completely passed it. For this purpose, a control bore leading to a pilot valve, which when pressurized opens the additional bore, may be provided between the two bores. Thus, the additional bore opens only if the piston has passed the control bore. This prevents the undesirable noise and precludes erosion-associated seal damage. Since the control bore is only a very small bore, it does not cause the same problems as the additional bore for pressure relief.

Further advantages and characteristics of the invention result from the following description, which makes reference to the figures.

Figure 1:
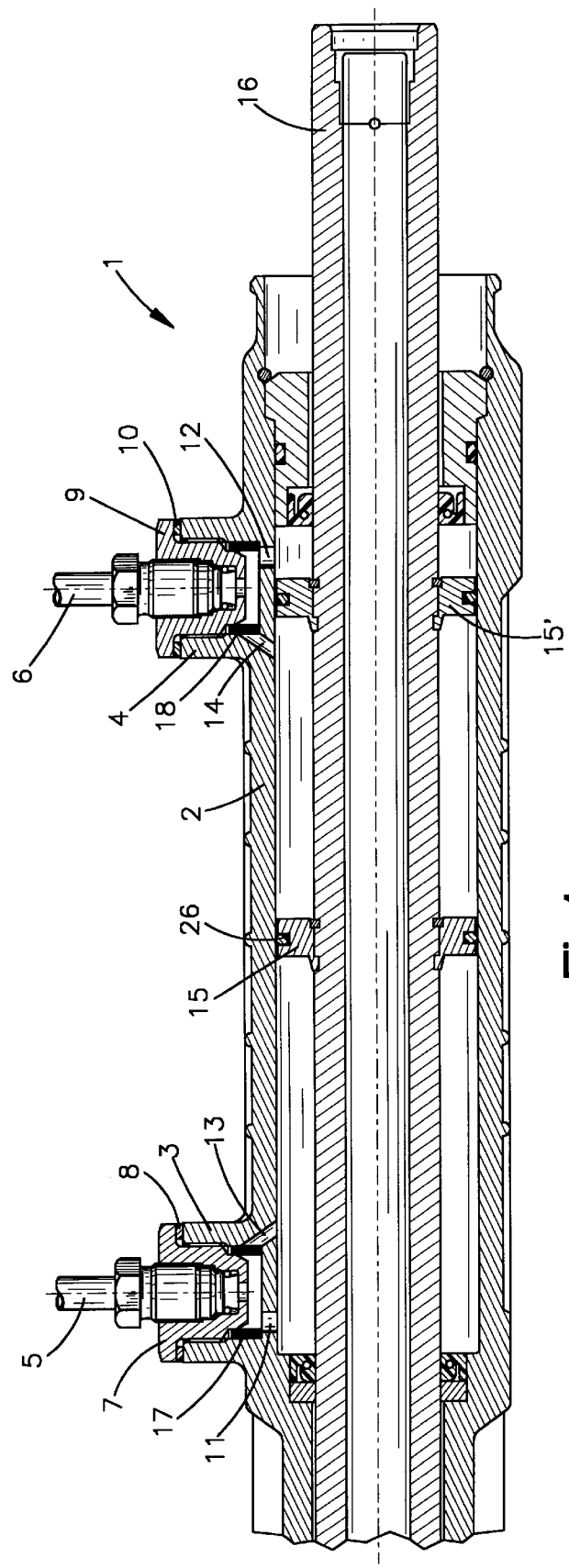
FIG. 1 is a schematic partial section of one exemplary embodiment for a rack and pinion steering unit.
Figure 3:
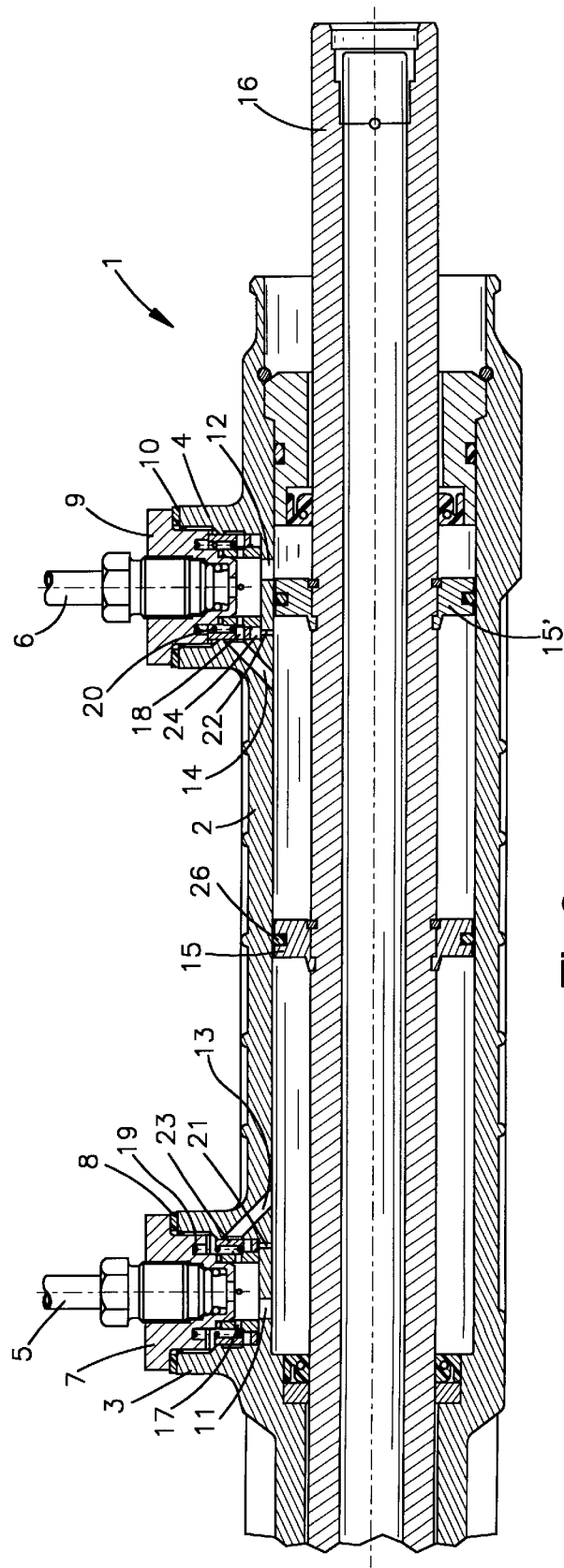
FIG. 3 is a schematic partial section of an additional exemplary embodiment of a rack and pinion steering unit.

The exemplary embodiments for a rack and pinion steering unit shown in FIGS. 1 and 3 are identical with respect to a number of elements. Rack and pinion steering 1 comprises a housing 2 that defines a cylinder area, at both ends of which pressure connection areas 3 and 4 are formed. Pressure connections 5 and 6, which are connected with pressure lines, are screwed into pressure connection areas 3 and 4. In the embodiment shown, pressure connections 5 and 6 are screwed into pressure connection areas 3 and 4 by means of adapters 7, 9 while inserting corresponding seals 8, 10. Pressure fluid bores 11, 12 for the supply and removal of hydraulic medium are formed in the two pressure connection areas 3, 4. These bores 11, 12 permit the hydraulic medium to be supplied to and removed from the cylinder. The cylinder area in housing 2 is hydraulically sealed on both sides. Attached to rack 16 is a piston 15, which can be pressurized on both sides by the hydraulic medium that is supplied to and removed from the cylinder area through bores 11, 12. Accordingly, the rack moves in one or the other direction, as does piston 15, which is shown in a piston end stop position 15' indicated by a dashed line. To implement the end stop, pressure-relief bores 13, 14 are formed in the two pressure connection areas 3, 4. These are bores that are substantially parallel to the pressure fluid bores 11, 12 but are offset toward the center of the cylinder. If piston 15 is pressurized from the left side in the focal plane of FIG. 1 or 3 by applying hydraulic pressure via the pressure fluid line and pressure connection 5 through pressure fluid bore 11 while hydraulic medium is returned via pressure fluid bore 12 and pressure connection 6 on the right piston side, piston 15 travels toward the right. As soon as piston 15 has passed pressure-relief bore 14 and approximately readies the piston position identified by 15', the hydraulic pressure prevailing on the left side of the piston is reduced via pressure-relief bore 14 and pressure connection 6. The piston cannot be further shifted toward the right.

To the aforementioned extent, the embodiments according to FIGS. 1 and 3 are identical. The problem is that when piston ring 26 passes pressure-relief bores 13 or 14, the pressure-relief bores are opened only slightly at first. This causes an undesirable hissing noise.

Figure 2:
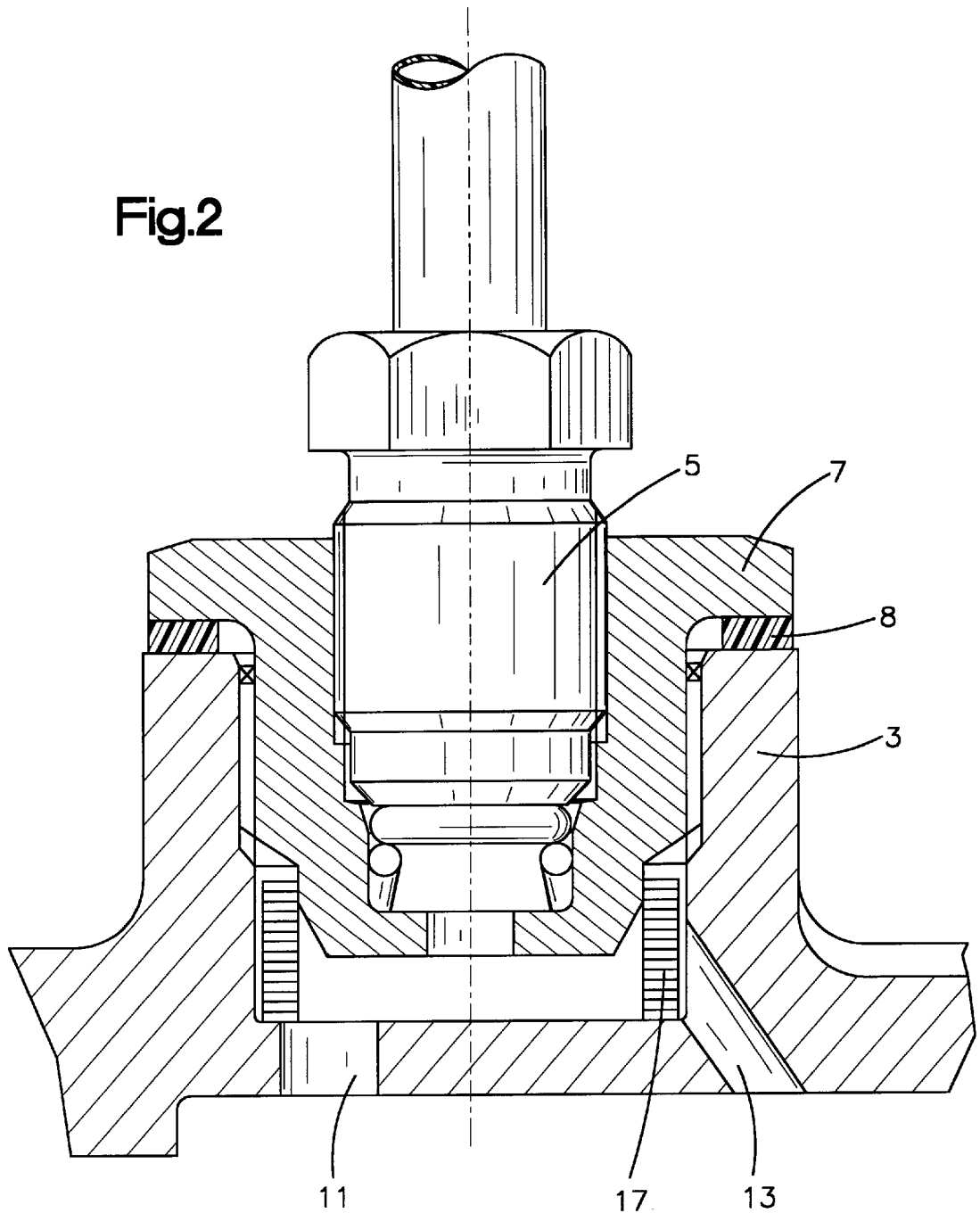
FIG. 2 is a detail representation of a pressure connection area in accordance with FIG. 1.

FIGS. 1 and 2 illustrate an embodiment for preventing undesirable hissing noise wherein a filter element 17 or 18 is inserted in the pressure connection area. Since the two pressure connection areas 3, 4 are in mirror symmetry to each other but otherwise identical, FIG. 2 shows only the left pressure connection area 3. Due to the mirror symmetry, the descriptions apply equally to pressure connection area 4. The filter element according to the embodiment shown in FIGS. 1 and 2 consists of a sleeve-like element 17 or 18, which is fixed in position in pressure connection area 3 when adapter 7 is installed. Filter element 17 resists hydraulic flow whine pressure-relief bore 13, which is normally provided with a non-return valve (not shown), opens. This effectively reduces the undesirable hissing noise. In the exemplary embodiment shown, filter element 17 is a sintered metal, a wire mesh, a perforated bushing or the like.

Figure 4:
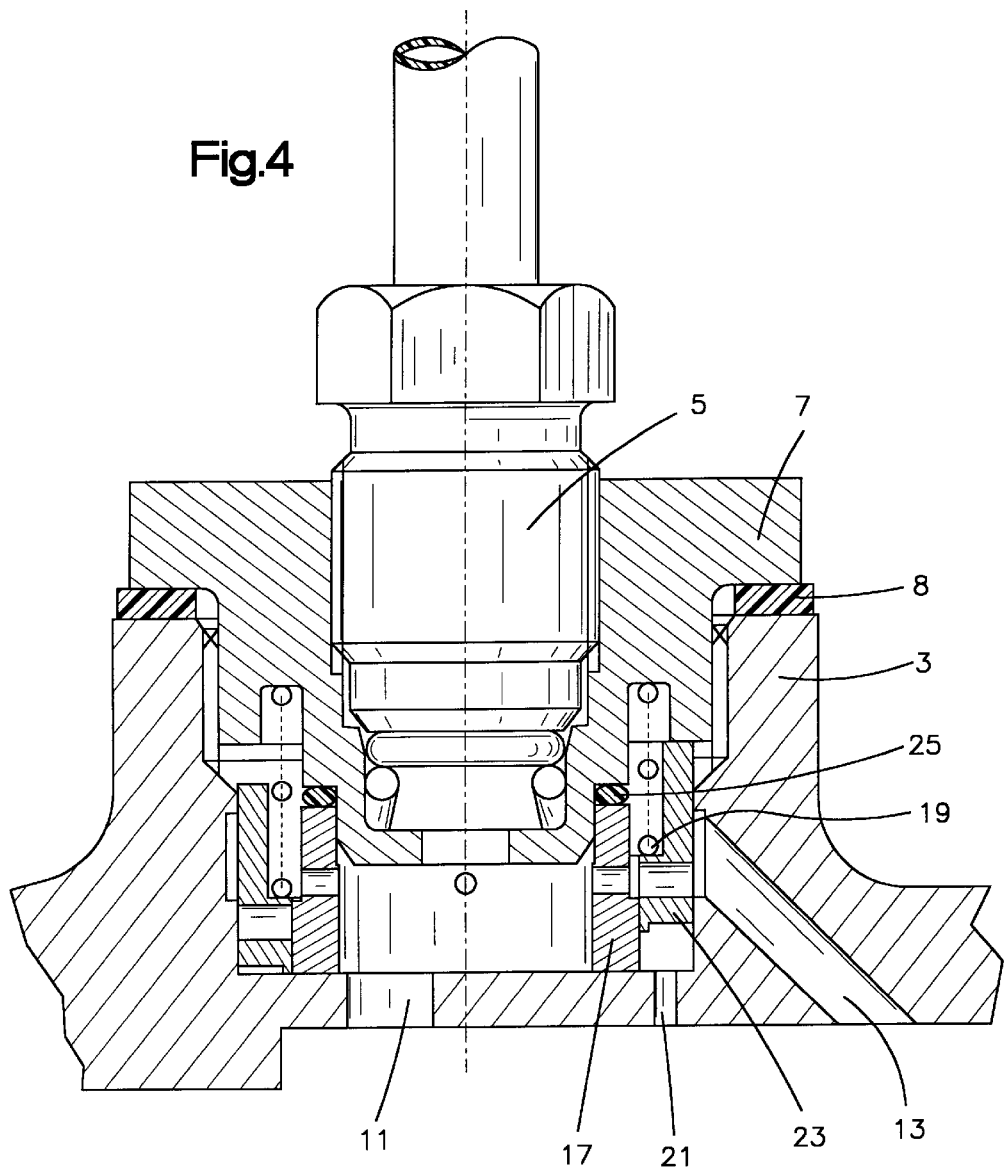
FIG. 4 is an enlarged detail representation of a pressure connection area in accordance with FIG. 3.
Figure 5:
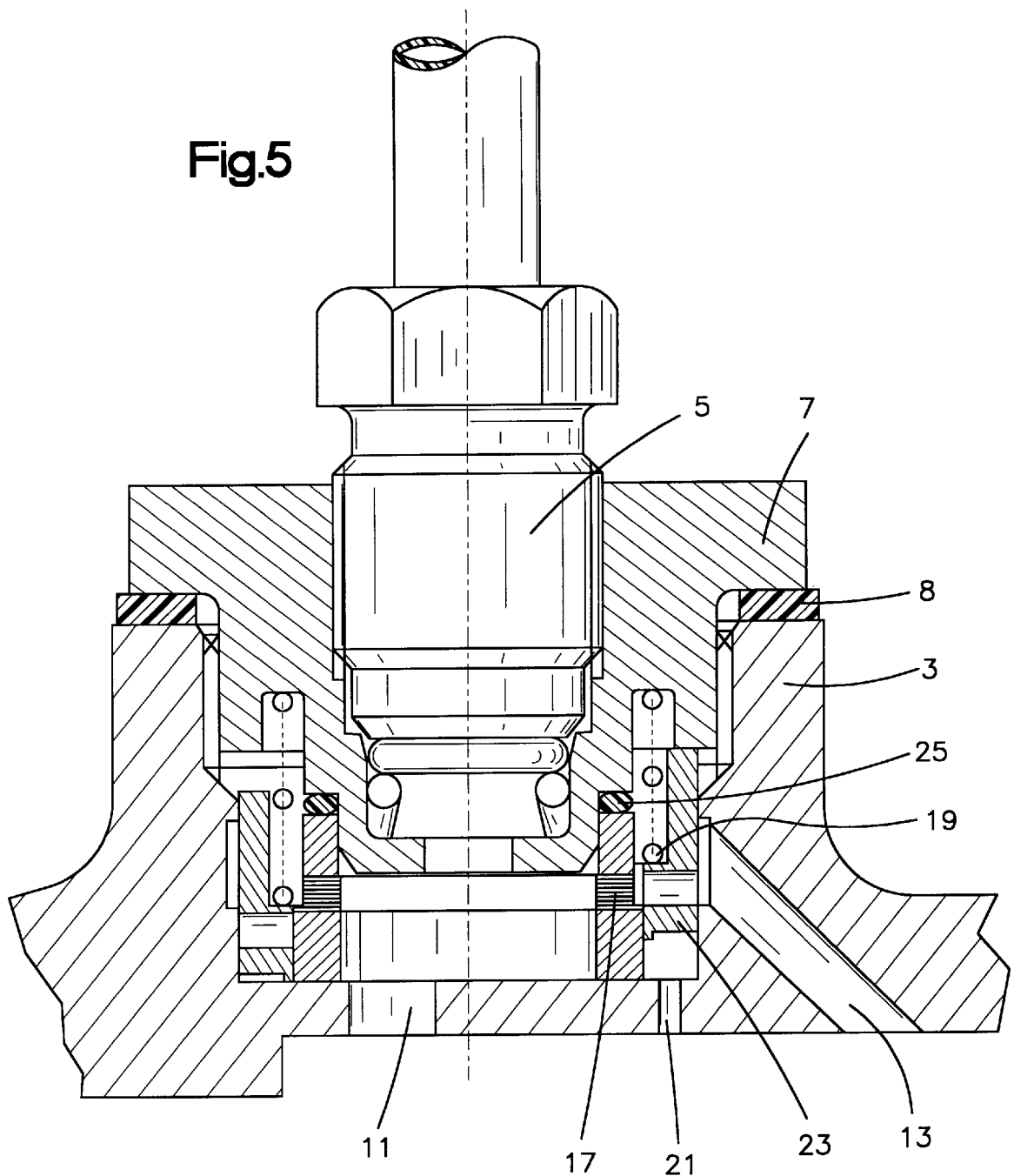
FIG. 5 is an enlarged detail representation of a pressure connection area according to FIG. 3 and according to an alternative exemplary embodiment.

A further development is shown in the embodiment of FIGS. 3 through 5 where filter elements 17 or 18 have a reduced diameter and are used in a control mimic. The control mimic comprises a control bore 21 or 22 disposed between the respective pressure fluid bore 11 and 12 and the associated pressure-relief 13 and 14. Control bore 21 or 22 has a significantly reduced diameter compared to the other two described bores. A pilot valve 23 or 24 prestressed in closing position by means of a spring 19 or 20 may be moved over control bore 21 or 22 to open the respective pressure-relief bore 13 or 14. The hydraulic medium can then flow through the pressure-relief bore and the pilot valve and subsequently pass the respective filer element 17 or 18.

FIGS. 4 and 5 depict enlarged alternative embodiments based on pressure connection areas 3 shown in the image planes on the left.

The figures show that the respective filter element 17 is mounted by means of a seal 25. The lower area of adapter 7 is slightly modified and is provided with a bore to receive a spring or a spring sleeve. The spring or spring sleeve loads a pilot valve and holds it in the lower position. As soon as a piston passes pressure-relief bore 13, the latter initially remains closed by the pilot valve. Only when piston 15 also passes control bore 21, hydraulic pressure is applied to the lower hydraulically active area of pilot valve 23 such that pilot valve 23 is pressed upward against the force of spring 19 until pressure relief bore 13 is opened. The hydraulic medium can then pass pressure-relief bore 13 and pilot valve 23 and subsequently flow through filter element 17. In the embodiment according to FIG. 4, filter element 17 is a perforated bushing, that is, a bushing provided with a corresponding number of through-holes.

In the exemplary embodiment shown in FIG. 5, which is otherwise identical to the embodiment of FIG. 4, the filter element is provided with a flow area that may be made of sintered metal, a wire mesh or the like. The descriptions provided with respect to FIGS. 4 and 5 apply correspondingly to the respective right pressure connection areas 4. The described exemplary embodiments are intended to serve only as a clarification and are not to be construed as a limitation.

List of Reference Numbers:
1 rack and pinion steering
2 housing
3 pressure connection area
4 pressure connection area
5 pressure connection
6 pressure connection
7 adapter
8 sealing ring
9 adapter
10 sealing ring
11 pressure fluid bore
12 pressure fluid bore
13 pressure relief bore
14 pressure relief bore
15 piston
15' piston position
16 rack
17 filter element
18 filter element
19 spring
20 spring
21 control bore
22 control bore
23 pilot valve
24 pilot valve
25 seal
26 seal

What is claimed is:

1. A rack and pinion steering apparatus comprising:

a hydraulic cylinder having an axially extending cylindrical bore and two ends;

a rack extending through and being coaxial with the cylindrical bore of the hydraulic cylinder;

a piston extending radially from the rack and sealing against the cylindrical bore of the hydraulic cylinder, the piston being axially movable within the cylindrical bore by the pressurized fluid and dividing the cylindrical bore into two chambers;

a pressure connection area on the hydraulic cylinder near each end, each pressure connection area having a pressure fluid bore and a pressure relief bore, the pressure relief bores being located between the pressure fluid bores, each pressure fluid bore directing pressurized fluid to flow into and out of the cylindrical bore of the hydraulic cylinder, each pressure relief bore directing pressurized fluid to flow out of the cylindrical bore of the hydraulic cylinder;

a pressure connection being attached to each pressure connection area for directing pressurized fluid into or out of the cylindrical bore of the hydraulic cylinder; and a filter element through which the pressurized fluid flows, said filter element being located between the pressure relief bore and the pressure connection to minimize noise created by fluid flow through the pressure relief bore to the pressure connection.

2. A rack and pinion steering apparatus in accordance with claim 1 wherein the filter element is in the pressure connection area.

3. A rack and pinion steering apparatus in accordance with claim 1 wherein the filter element is a cylindrical tubular member.

4. A rack and pinion steering apparatus in accordance with claim 1 wherein the filter element has a flow resistance that depends on the direction of fluid flow through the filter element.

5. A rack and pinion steering apparatus in accordance with claim 1 further including a control valve for controlling fluid flow through the pressure relief bore.

6. A rack and pinion steering apparatus in accordance with claim 5 wherein the control valve has a closed position and an open position, the open position permitting fluid flow through the pressure relief bore to the pressure connection, the control valve being actuated to the open position by hydraulic pressure in the hydraulic cylinder.

7. A rack and pinion steering apparatus in accordance with claim 6 wherein a control bore is located between the pressure relief bore and the pressure fluid bore for supplying control pressure to the control valve to actuate the control valve to the open position.

8. A rack and pinion steering apparatus in accordance with claim 7 wherein the control valve is spring-biased within the connection area to the closed position.

* * * * *